United States Patent
Conroy et al.

(10) Patent No.: US 6,258,880 B1
(45) Date of Patent: *Jul. 10, 2001

(54) STABILIZERS FOR IMPROVED WEATHERABILITY OF CLEAR POLYVINYL CHLORIDE COMPOSITIONS

(75) Inventors: Gary M. Conroy, Cincinnati; Gene K. Norris, West Chester, both of OH (US)

(73) Assignee: Morton International, Inc., Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,974

(22) Filed: Nov. 25, 1998

(51) Int. Cl.$^7$ ........................................... C08K 5/58
(52) U.S. Cl. ..................................................... 524/180
(58) Field of Search ............................................. 524/180

(56) References Cited

U.S. PATENT DOCUMENTS

| | | | |
|---|---|---|---|
| 2,824,079 | 2/1958 | Fischer | 260/31.8 |
| 3,498,947 | 3/1970 | Seki et al. | 260/45.75 |
| 3,505,383 | 4/1970 | Seki et al. | 260/45.75 |
| 3,600,416 | 8/1971 | Seki et al. | 260/429.7 |
| 4,062,881 | 12/1977 | Kugele | 260/399 |
| 4,179,432 | 12/1979 | Molt | 260/45.75 |
| 4,681,907 | 7/1987 | Mesch et al. | 524/180 |
| 5,030,676 | 7/1991 | Wallen | 524/182 |
| 5,055,495 * | 10/1991 | Croce | 521/85 |
| 5,238,605 * | 8/1993 | Abeler | 252/400.1 |
| 5,244,949 * | 9/1993 | Wirth | 524/100 |
| 5,322,868 * | 6/1994 | Valet | 524/89 |
| 5,344,880 * | 9/1994 | Nambu | 525/100 |
| 5,670,563 * | 9/1997 | Zinke | 524/182 |
| 5,744,525 * | 4/1998 | Harvey | 524/84 |
| 5,925,696 * | 7/1999 | Wehner | 524/100 |

FOREIGN PATENT DOCUMENTS

| | | | |
|---|---|---|---|
| 759776 | 10/1956 | (GB) . | |
| 1001344 | 8/1965 | (GB) | C08K/5/57 |
| 1031487 | 6/1966 | (GB) | C08F/29/14 |

* cited by examiner

Primary Examiner—Paul R. Michl
(74) Attorney, Agent, or Firm—Robert M. Didrick

(57) ABSTRACT

Stabilizer compositions useful for protecting clear polyvinyl chloride and other clear halogenated polymer compositions against discoloration and degradation caused by exposure to light and weathering in addition to heat comprising an organotin compound selected from the group consisting of organotin mercaptides, sulfides of organotin mercaptides, organotin sulfides, and/or organotin carboxylates, and a free phenyl salicylate compound. These stabilizers offer improved ultraviolet light stability and weatherability to clear polyvinyl chloride resins designed for weatherable applications without detracting from the desired thermal performance.

Clear polyvinyl chloride resin and other clear halogenated polymer compositions are also provided, containing these compounds.

8 Claims, No Drawings

US 6,258,880 B1

STABILIZERS FOR IMPROVED WEATHERABILITY OF CLEAR POLYVINYL CHLORIDE COMPOSITIONS

FIELD OF THE INVENTION

This invention relates to novel stabilizer compositions that are capable of stabilizing clear polyvinyl chloride and other halogenated polymer compositions against the deteriorative effects of heat, light and weathering. Such stabilizer compositions comprise an organotin mercaptide, a sulfide of an organotin mercaptide, an organotin sulfide and/or an organotin carboxylate, and a free phenyl salicylate compound. This invention also relates to clear polyvinyl chloride and other halogenated polymer compositions stabilized therewith.

BACKGROUND OF THE INVENTION

It has long been known that halogenated polymers, such as commercially important polyvinyl chloride (PVC), are subject to deterioration or degradation when exposed to heat and light. Various chemical compounds and compositions have been developed to stabilize these polymers against such deterioration and attendant discoloration. For the most part, these stabilizers have been directed toward stabilization against heat, such as that encountered during processing of the polymer and its fabrication into articles. Among these heat stabilizers, some of the most effective have been the organotin stabilizers. Mono- and dialkyltin mercaptides and their sulfides, mono- and dialkyltin carboxylates, and mixtures of these organotin mercaptides and carboxylates, for example, are currently among the most widely used heat stabilizers.

While organotin stabilizers are excellent heat stabilizers, they provide less than desired weathering and light, particularly ultraviolet light, stabilization. This is evident in articles formed from such organotin-stabilized halogenated polymer compositions. Upon prolonged exposure to light, these articles tend to yellow and decompose with attendant loss in physical properties, e.g., tensile strength, flexibility, and impact resistance, which shortens the useful life of the articles. Haziness, which sometimes accompanies the color changes, is particularly undesirable where clear products are needed. Organotin carboxylates and organotin mercaptide/carboxylates offer better ultraviolet light stability and weathering properties than do organotin mercaptides, although all have generally beer, inadequate for weatherable applications, for example, in articles designed for outdoor use.

With increased use of rigid (unplasticized) halogenated polymer compositions for articles that will be exposed to ambient light and weathering for long periods of time, for example, vinyl housing siding, window frames, window profiles, corrugated roofing, and door stripping, it has become increasingly important to develop a stabilizer that will not only protect the halogenated polymer against heat encountered during processing and fabrication, but will also protect the polymer against the long term effects of light and weathering. Such a stabilizer is particularly needed for clear halogenated polymer compositions which are known to have very poor light stability and weatherability, as they generally do not contain fillers and pigments, such as titanium dioxide, which inhibit light from penetrating into the articles formed therefrom and thus reduce the rate of polymer degradation. However, until the present invention, no single stabilizer composition was completely satisfactory for protecting halogenated polymer compositions, particularly clear halogenated polymer compositions, against heat as well as light and weathering.

Attempts have been made in the past to improve the weathering and light stability of organotin stabilizers. For instance, it has been proposed to combine an organotin stabilizer with certain non-metallic organic compounds known to function as ultraviolet light absorbers, such as benzophenones and benzotriazoles. However, such compounds are typically very expensive, due to the complexities of their manufacture, with the result being that in relatively low cost products, the price of such ultraviolet stabilizers is difficult to bear.

The use of less expensive ultraviolet stabilizers, such as phenyl salicylate compounds, in combination with non-organotin heat stabilizers have also been proposed. For example, it is taught in U.S. Pat. No. 2,824,079 (Fischer) to stabilize flexible (plasticized) polyvinyl chloride compositions against the degrading effects of light in addition to heat by adding thereto small amounts of a phenyl salicylate compound in combination with a bisphenol heat stabilizer. A lead-based heat stabilizer is also suggested for this combination.

U.S. Pat. No. 3,505,383 (Seki et al.) and U.S. Pat. No. 3,600,416 (Seki et al.) teach the use of phenyl salicylate compounds as ligands alone or in combination with other ligands, such as mercaptide or carboxylate ligands, which are directly bound to a tin atom of an organotin stabilizer for improved light stability. However, when phenyl salicylate ligands are employed with mercaptide or carboxylate ligands, the stabilizers so-formed contain a much lower mercaptide or carboxylate content as compared to traditional organotin stabilizers of the same class. It is well known that reducing the mercaptide or carboxylate ligand content tends to adversely affect thermal stability.

U.S. Pat. No. 5,030,676 (Wallen) only generally mentions the use of various ultraviolet stabilizers, inclusive of salicylates, in combination with various heat stabilizers, inclusive of organotin mercaptides and organotin carboxylates and, besides, specifically focuses on opaquely pigmented ($TiO_2$/MgO) halogenated polymer compositions. Moreover, attempts by the present inventors to use such a combination to improve weathering and light stability of pigmented (opaque) halogenated polymer compositions have never been successful. When unbonded (free) phenyl salicylates are employed in pigmented halogenated polymer compositions in the presence of organotin stabilizers, it has been found that the salicylates are not functionally active therein and thus do not impart any benefit in terms of light and weathering stability to the pigmented compositions. One skilled in the art would generally expect this stabilizer combination to perform no differently in clear halogenated polymer compositions.

Thus, in spite of the progress that has been made in the industry and the plurality of stabilizer combinations that have been proposed for improving weathering and light stability, organotin mercaptides, their sulfides, organotin carboxylates, and mixtures thereof, are still being used alone in clear halogenated polymer compositions intended for weatherable applications due to the high cost and/or ineffectiveness of the proposed combinations. Much effort is, therefore, still being devoted to finding better stabilizers for clear halogenated polymer compositions, especially for the commercially important clear rigid polyvinyl chloride compositions devised for exterior weatherable applications, which stabilizers are inexpensive and will give desired weathering and light stability in addition to heat stability.

It is, therefore, a primary object of this invention to provide stabilizer compositions comprising synergistic combinations of organotin mercaptides (including their sulfides), organotin sulfides and/or organotin carboxylates and free phenyl salicylates that are not only inexpensive, but that also unexpectedly offer light stability and weatherability in addition to heat stability to clear polyvinyl chloride and other halogenated polymer compositions.

SUMMARY OF THE INVENTION

In accordance with the present invention, there are provided stabilizer compositions capable of stabilizing clear halogenated polymer compositions against the deteriorative effects of heat, light and weathering which comprises the product produced by combining: A) an organotin compound or mixture of organotin compounds selected from the group consisting of organotin mercaptides, sulfides of organotin mercaptides, organotin sulfides, organotin carboxylates, and mixtures thereof such as organotin mercaptide/carboxylate mixtures, and B) in an amount sufficient to synergize the stabilization of halogenated polymers, a free phenyl salicylate compound. The clear polymer compositions stabilized therewith unexpectedly possess improved resistance to ultraviolet light and weathering in addition to heat.

In accordance with another aspect of this invention, there are also provided clear polymer compositions that exhibit improved light stability and weathering in addition to heat stability comprising a clear halogenated polymer composition, and in an amount sufficient to stabilize the polymer against the deteriorative effects of heat, light and weathering, a stabilizer composition of the aforesaid character.

DETAILED DESCRIPTION OF THE PREFERRED EMBODIMENTS

This invention is directed to clear halogenated polymer compositions, especially the commercially important clear polyvinyl chloride compositions. By "clear", it is meant that the halogenated polymer compositions will result in articles which are essentially transparent. As will be appreciated by those skilled in the art, generally such compositions are substantially free of opaque pigments and fillers.

It has now been quite unexpectedly discovered that clear halogenated polymer compositions, especially commercially important clear rigid (unplasticized) polyvinyl chloride compositions devised for exterior weatherable applications, in contrast to pigmented halogenated polymer compositions, can be stabilized against the degrading effects of light and weathering in addition to heat by incorporating therein a stabilizingly effective amount of a stabilizer composition comprising the combination of A) at least one organotin stabilizer selected from the group consisting of organotin mercaptides (or their sulfides), organotin sulfides, organotin carboxylates, and mixtures thereof and B) at least one free phenyl salicylate compound.

The organotin mercaptides (or their sulfides) useful in this invention are well known compounds, which may be described by the following four classes of compounds:
1. an organotin mercaptide of a mercapto-carboxylic acid ester which can be described by the formula:

$$R^1_{(4-x)}-Sn-[S-R^2-(C(=O)OR^3)]_x \qquad (I)$$

where
$R^1$ is at each independent occurrence selected from an alkyl, alkenyl, cycloalkyl, cycloalkenyl, or aryl radical;

$R^2$ is at each independent occurrence selected from an alkylene, alkenylene, cycloalkylene, cycloalkenylene, arylene, alkynylene, or tetravalent carbon radical, or hydroxy-substituted derivatives thereof;
$R^3$ is at each independent occurrence selected from hydrogen, alkyl, alkenyl, cycloalkyl, cycloalkenyl, aryl radical, hydroxy-substituted derivatives thereof, or $-R^4-OC(=O)R^5$;
$R^4$ is at each independent occurrence selected from alkylene, alkenylene, cycloalkylene, cycloalkenylene, arylene, or polyalkoxy radical;
$R^5$ is at each independent occurrence selected from hydrogen, alkyl, alkenyl, cycloalkyl, cycloalkenyl, aryl, alkyloxy, or polyalkyloxy radical; and,
x is 2 or 3.

The organotin mercaptides of mercapto-carboxylic acid esters which are preferred in the practice of this invention are the mono- and dialkyltin alkylthioalkanoates which are those compounds according to Formula I where $R^1$ is an alkyl radical having from about 1 to 12 carbon atoms, $R^2$ is an alkylene radical having from about 1 to 8 carbon atoms, $R^3$ is an alkyl radical having from about 5 to 20 carbon atoms, and x is 2 or 3. Examples of the preferred compounds of Formula I include, but are not limited to, monomethyltin tris(2-ethylhexylthioglycolate), dimethyltin bis(2-ethylhexylthioglycolate), monobutyltin tris(2-ethylhexylthioglycolate), dibutyltin bis(2-ethylhexylthioglycolate), monooctyltin tris(2-ethylhexylthioglycolate), and dioctyltin bis(2-ethylhexylthioglycolate).

The organotin mercaptides of mercapto-carboxylic acid esters can be prepared by any of several well known methods, such as by the reaction of corresponding mercaptocarboxylic acid esters with mono- and dialkyltin oxides or halides, especially chlorides.

2. a sulfide of an organotin mercaptide of Formula I, which can be described as a mixture of at least:
an organotin mercaptide of Formula I; and,
an organotin mono- or polysulfide or oligomer thereof which can be described by the formula (which is representative of linear structures as well as of cyclic structures including cyclic trimers and adamantyl rings):

$$[R^7_{(4-x)}SnS_{(p/2)}]_m-[R^8_{(4-y)}SnS_{(q/2)}]_n \qquad (II)$$

where
$R^7$ and $R^8$ are at each independent occurrence are selected from $R^1$ and are bonded to Sn; and,
at each independent occurrence x and y are 2 or 3; p and q are any integer from 2 to 20;
m and n are 0 or any integer from 1 to 10;
with the proviso that: m and n are not both equal to 0; when (4−x)=(4−y), p=q; and, when (4−x) (4−y), p q.

The sulfides of an organotin mercaptide of Formula I which are preferred in the practice of this invention include mixtures at least containing a preferred mono- and dialkyltin alkylthioalkanoate of Formula I, a mono- or dialkyltin mono- or polysulfide or oligomer thereof of Formula II where $R^7$ and $R^8$ are independently alkyl radicals having from about 1 to 12 carbon atoms, x and y are independently 2 or 3, p and q are independently 2 to 4, and m and n are independently 0 to 4, and which may also contain reaction products thereof. Examples of the preferred mono- and dialkyltin sulfides compounds of Formula II include, but are not limited to, linear monoalkyltin monosulfides, such as $(R^7SnS_{1.5})_2$ where x=3, q=3, m=2, and n=0, oligomeric monoalkyltin monosulfide adamantyl rings, such as $R^7_4Sn_4S_6$ where x=3, q=3, m=4, and n=0, linear dialkyltin monosulfides, such as $R^8_2SnS$ where y=2, p=3, n=1, and m=0, oligomeric dialkyltin monosulfide cyclic trimers, such as $(R^8_2SnS)_3$ where y=3, p=2, n=3, and m=O, and oligomeric mixed mono- and alkyltin monosulfides, such as cyclic $[R^7SnS]_4$—$[R^8_2SnS_{1.5}]_3$ where x=3, q=3, m=4, y=2, p=2, and n=3.

The sulfides can be prepared according to any of the several well known methods, such as by mixing in an alkaline aqueous solution, a corresponding mercaptocarboxylic ester, an akali metal-, an alkaline earth metal-, or ammonium sulfide, and a mono- or di-organotin halide, especially the chlorides.

It should be understood that the structures of the above sulfides are very complex and difficult to characterize. The above reaction is believed to form an equilibrium mixture composed of several different but related products. As will be appreciated by those of ordinary skill in chemistry, equilibrium mixtures inherently include the starting materials as well as products arising from any reaction between them. The chemical and patent literature contain numerous examples demonstrating that members of different classes of organotin compounds may react with one another under certain conditions to yield products containing one or more tin atoms wherein at least a portion of the tin atoms are bonded to different combinations of radicals than they were before being mixed together. The sulfides produced are therefore believed to include as well products of the mixture described above such as bis[(monoalkyltin)-bis(alkylthioalkanoate)] mono- and polysulfides, bis[(dialkyltin)-mono(alkylthioalkanoate)] mono- and polysulfides, along with the products which arise during reactions among the starting materials, including the above-described monoalkyltin tris(alkylthioalkanoates) and/or dialkyltin bis(alkylthioalkanoates) and mono- and/or dialkyltin mono- and polysulfides and oligomers thereof, as well as the starting materials themselves including the alkyltin halides.

3. an organotin mercaptide of mercaptoalkyl carboxylic acid ester which can be described by the formula:

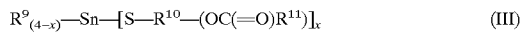

$$R^9_{(4-x)}-Sn-[S-R^{10}-(OC(=O)R^{11})]_x \quad (III)$$

where
R⁹ is at each independent occurrence selected from an alkyl, alkenyl, cycloalkyl, cycloalkenyl, or aryl radical;
R¹⁰ is at each independent occurrence selected from an alkylene of at least 2 carbon atoms, alkenylene of at least 2 carbon atoms, cycloalkylene, or cycloalkenylene, an alkynylene, or tetravalent carbon radical, or hydroxy-substituted derivatives thereof;
R¹¹ is at each independent occurrence selected from hydrogen, alkyl, alkenyl, cycloalkyl, cycloalkenyl, aryl radical, or hydroxy-substituted derivatives thereof, or —R¹²C(=O)OR¹³;
R¹² is at each independent occurrence an alkylene, alkenylene, or arylene radical;
R¹³ is at each independent occurrence selected from hydrogen, alkyl, alkenyl, cycloalkyl, cycloalkenyl, radical, alkyloxy, or polyalkyloxy radical; and,
x is 2 or 3.

The organotin mercaptides of mercaptoalkyl carboxylic acid esters which are preferred in the practice of this invention are the mono- and dialkyltin mercaptoalkylalkanoates which are those compounds according to Formula III where R⁹ is an alkyl radical having from about 1 to 12 carbon atoms, R¹⁰ is an alkylene radical having at least 2 up to about 8 carbon atoms, R¹¹ is an alkyl radical having from about 1 to 17 carbon atoms or phenyl radical, and x is 2 or 3. Examples of the preferred compounds of Formula III include, but are not limited to, monomethyltin tris (mercaptoethyloleate), dimethyltin bis (mercaptoethyloleate), monobutyltin tris (mercaptoethylpelargonate), and dibutyltin bis (mercaptoethylpelargonate).

Such compounds can be prepared by any of several well known methods, such as by the reaction of corresponding mercaptoalkylcarboxylic acid esters with mono- and dialkyltin oxides or halides, especially chlorides.

4. a sulfide of the organotin mercaptide of Formula III, which can be described as a mixture of at least:
an organotin mercaptide of Formula III; and,
an organotin mono- or polysulfide or oligomer thereof of Formula II, with the further proviso that R⁷ and R⁸ are at each independent occurrence selected from R⁹.

The sulfides which are preferred in the practice of this invention include mixtures at least containing a preferred mono- and dialkyltin mercaptoalkylalkanoate of Formula III, a preferred mono- or dialkyltin mono- or polysulfide or oligomers of Formula II, and which may also contain reaction products thereof. Examples of the preferred mono- or dialkyltin mono- or polysulfide or oligomers of Formula II are already given above.

These sulfides can be prepared according to any of the several well known methods, such as by mixing in an alkaline aqueous medium, a corresponding mercaptoalkyl-carboxylic ester, an akali metal-, an alkaline earth metal-, or ammonium sulfide, and a mono- or di-organotin halide, especially the chlorides.

It should be understood that the structures of the above sulfides are similarly very complex and difficult to characterize and it is believed that the same rule applies for their characterization as set forth above for the previously described organotin mercaptoester sulfides.

As with the previously described sulfides, the equilibrium mixture, which is believed to result, is believed to be composed of several different but related products. The sulfides produced are believed to include as well products of the mixture described above such as bis[(monoalkyltin)-bis (mercaptoalkylalkanoate)] mono- and polysulfides, bis[(dialkyltin)-mono(mercaptoalkylalkanoate)] mono- and polysulfides, along with the products which arise during equilibrium reactions among the starting materials, including the above-identified monoalkyltin tris (mercaptoalkylalkanoates) and/or dialkyltin bis (mercaptoalkylalkanoates) and the mono- and/or dialkyltin mono- and polysulfides and oligomers thereof, as well as the starting materials themselves including the alkyltin halides.

Particularly useful in the practice of this invention are mixtures of monoalkyltin and dialkyltin mercaptides or sulfides thereof.

The organotin sulfides which may be employed in accordance with this invention are well known compounds, which can be described by the formula (which includes linear structures as well as of cyclic structures such as cyclic trimers and adamantyl rings):

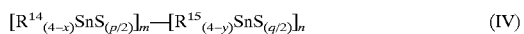

$$[R^{14}_{(4-x)}SnS_{(p/2)}]_m-[R^{15}_{(4-y)}SnS_{(q/2)}]_n \quad (IV)$$

where
R¹⁴ and R¹⁵ are at each independent occurrence are selected from an alkyl, alkenyl, cycloalkyl, cycloalkenyl, or aryl radical and are bonded to Sn; and,
at each independent occurrence x and y are 2 or 3; p and q are any integer from 2 to 20;
m and n are 0 or any integer from 1 to 10;
with the proviso that: m and n are not both equal to 0; when (4−x)=(4−y), p=q; and, when (4−x) (4—y), p q.

The organotin sulfides which are preferred in the practice of this invention are the mono- and dialkyltin mono- or polysulfide compounds or oligomers thereof according to Formula IV where $R^{14}$ and $R^{15}$ are independently alkyl radicals having from about 1 to 12 carbon atoms, x and y are independently 2 or 3, p and q are independently 2 to 4, and m and n are independently 0 to 4. Specific examples of such preferred organotin sulfides are already given above for the Formula II compounds.

These sulfides can be prepared according to any of the several well known methods, such as by mixing in an alkaline aqueous medium, a corresponding alkali metal-, an alkaline earth metal-, or ammonium sulfide, and a mono- or di-organotin halide, especially the chlorides.

The organotin carboxylates which may be employed in accordance with this invention are well known compounds, which can be described by the following general formulas;

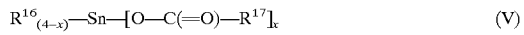
$$R^{16}{}_{(4-x)}\text{—Sn—}[\text{O—C}(=\text{O})\text{—}R^{17}]_x \qquad (V)$$

where
$R^{16}$ is at each independent occurrence selected from an alkyl, alkenyl, cycloalkyl, cycloalkenyl, or aryl radical;
$R^{17}$ is at independent occurrence selected from hydrogen, an alkyl, alkenyl, cycloalkyl, or cycloalkenyl radical, or hydroxy-substituted derivatives thereof, $-R^{18}-C(=O)OR^{19}$, or $-R^{18}-C(=O)OR^{20}OC(=O)R^{19}$;
$R^{18}$ is at each independent occurrence selected from an alkylene, alkenylene, cycloalkylene, cycloalkenylene, or arylene radical;
$R^{19}$ is at each independent occurrence selected from hydrogen, an alkyl, alkenyl, cycloalkyl, cycloalkenyl, aryl, alkylalkyloxy, or alkylpolyalkyloxy radical;
$R^{20}$ is at each independent occurrence selected from an alkyl, alkenyl, cycloalkyl, cycloalkenyl, aryl, alkylene alkyloxy, or alkylene polyalkyloxy radical; and,
x is 2 or 3.

$$R^{21}{}_x SnA_y \qquad (VI)$$

where
$R^{21}$ is at each independent occurrence selected from an alkyl, alkenyl, cycloalkyl, cycloalkenyl, or aryl radical;
A is at each independent occurrence $-\text{OC}(=O)R^{22}C(=O)O-$;
$R^{22}$ is at each independent occurrence selected from alkylene, alkenylene, cycloalkylene, cycloalkenylene, arylene, alkynylene, or tetravalent carbon radical, or hydroxy-substituted derivatives thereof; and,
x is 1 or 2, and y is 1, 2 or 3, with the proviso that X+y=4.

The organotin carboxylates which are preferred in the practice of this invention are the mono- and dialkyltin alkylalkanoates which are those compounds according to Formula V where $R^{16}$ is an alkyl radical having from about 1 to 12 carbon atoms, $R^{17}$ is an alkyl radical having from about 2 to 17 carbon atoms, and x is 2 or 3. Examples of the preferred compounds of Formula V include, but are not limited to, monobutyltin tris(dodecylmaleate), dibutyltin bis(butyl maleate), diethyltin azelate, diethyltin dilaurate, dimethyltin dibenzoate, dimethyltin bis(butyl carbitol maleate), and dimethyl bis(tetraethylene glycol maleate).

The organotin carboxylate compounds can be prepared by any of several well known methods, such as by the reaction of corresponding carboxylic acids with mono- and dialkyltin oxides or halides, especially the chlorides.

The compounds employed in combination with the above-described organotin mercaptide compounds (or their sulfides) and/or organotin carboxylates in the practice of this invention are free phenyl salicylate compounds. By "free", it is meant that the phenyl salicylate is used independently, i.e., is physically combined, in the stabilizer composition of this invention instead of being provided as a ligand that is directly bond to a tin atom of the organotin mercaptide or organotin carboxylate compound.

The phenyl salicylate compounds which are useful herein are represented by compounds having the following general formula:

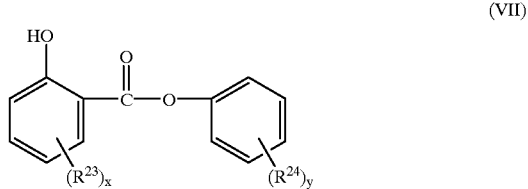

(VII)

where
$R^{23}$ and $R^{24}$ are at each independent occurrence selected from hydrogen, an alkyl, phenyl, alkoxy, phenoxy, alkylcarboxy, hydroxyl, halogen, carboxyl, benzoyl, glycidyl, glycidylamino, alkylamino, amido, hydroxypolyalkoxy, alkoxypolyalkoxy, or acyloxypolyalkoxy radical; and, x is any integer from 1 to 4, and y is any integer from 1 to 5.

The phenyl salicylates which are preferred in the practice of this invention are those according to Formula VII where $R^{23}$ is hydrogen and x is 4, and either $R^{24}$ is a hydrogen atom and y is 5, or $R^{24}$ is an alkyl radical having from about 1 to 12 carbon atoms and y is 1. Examples of phenyl salicylate compounds of Formula VII useful herein include, but are not limited to, phenyl salicylate, 2'-dodecylphenyl salicylate, 4'-methoxyphenyl salicylate, 4-methoxyphenyl salicylate, 4'-chlorophenyl salicylate, 4-acetamidophenyl salicylate, 1-hydroxy-2-phenyinaphthoate, 5-chlorophenyl salicylate, 4-N-glycidylaminophenyl salicylate, and the like, with phenyl salicylate and 2'-dodecylphenyl salicylate being most preferred.

The prime (') denotes $R^{24}$ substituents, with the $R^{23}$ substituents being unprimed. It should be understood that it may also be possible to employ derivatives of the phenyl salicylates, for example, corresponding anilide or pyridinyl structures, although currently such derivatives are not preferred in view of relatively lower heat stability.

As used in the above formulas and throughout this specification unless otherwise indicated, the named organic radicals are straight or branched chain radicals which contain, for example, from about 1 to 20 carbon atoms, and the term poly refers to 2 or more repeat units of the named radical.

It should be understood in the practice of this invention that any combination of the above organotin stabilizer chemistries is possible with the free phenyl salicylate structure. Generally, the amount of organotin mercaptide, their sulfide, organotin sulfide and/or organotin carboxylate and free phenyl salicylate in the stabilizer composition of this invention will depend upon several factors, including, but not limited to, the particular compounds employed, the particular resin to be stabilized, the severity of heat, light and weathering to which the resin will be subjected and the degree of stabilization desired. Thus, the amount of each component may vary widely, it being required only that the stabilizer composition contain enough of each component to stabilize a halogenated polymer against the deteriorative effects of heat, light and weathering, and that the free phenyl salicylate be present in an amount which will synergize such stabilization.

Desirably, the stabilizer composition in accordance with this invention which contain A) an organotin mercaptide, sulfide thereof, organotin sulfide or organotin carboxylate and B) a free phenyl salicylate employ these compounds in an amount ranging from about 65 to 98 wt. % of the organotin stabilizer and from about 2 to 35 wt. % free phenyl salicylate compound, the percentages being based on the combined weight of organotin stabilizer and free phenyl salicylate compound. Preferably, these compounds are employed in an amount ranging from about 85 to 95 wt. % of the organotin stabilizer and from about 5 to 15 wt. %, free phenyl salicylate compound. When the stabilizer composition in accordance with this invention employ mixtures of different classes of organotin stabilizers, for example, an organotin mercaptide/carboxylate mixture and a free phenyl salicylate compound, the amount of phenyl salicylate compound employed generally stays the same as that stated above for the non-mixtures. However, the organotin portion of the stabilizer would generally contain from about 30 to 70 wt. % organotin mercaptide and about 70 to 30 wt. % organotin carboxylate, preferably from about 40 to 60 wt. % organotin mercaptide and about 60 to 40 wt. % organotin carboxylate, the percentages being based on the combined weight of only the organotin mercaptide and organotin carboxylate.

The stabilizer compositions of this invention can be made quite simply using methods well known in the art and conventional equipment. For example, the components can be simply combined physically as by mixing, blending, stirring or shaking, until a homogenous liquid mixture is provided. The liquid stabilizer composition can then be easily measured and blended into the halogenated polymers during processing. It is preferred to supply the stabilizer combination in premixed form rather than as individual components. Likewise, the halogenated polymer compositions of this invention may be prepared by physically blending the stabilizer composition and the polymer (plus any desired additives) in any convenient manner until the stabilizer composition is thoroughly dispersed throughout the polymer composition. In normal commercial practice, this is accomplished by high intensity mixing. Alternatively, the stabilizer components can be added to the polymer composition individually. The so-stabilized clear polymer composition may then be used for forming a variety of articles, particularly rigid articles that are intended for exterior weatherable applications and as such will be exposed to prolonged periods of light and weathering, for example, vinyl corrugated roofing, door stripping, and other exterior applications that desire clear formulations. A variety of conventional techniques may be employed to shape the polymer composition into the desired article, for example, molding, extrusion, injection molding, etc.

As with the relative amounts of organotin and phenyl salicylate compounds employed, the amount of stabilizer composition incorporated in the halogenated polymer composition of this invention may vary considerably. Only a minimum amount of the above stabilizer composition is required. While this minimum amount can vary depending upon the particular stabilizer composition components and the relative amounts employed, in general, as little as 0.5 wt. % of stabilizer composition based on the weight of the halogenated organic polymer will be sufficient to impart the desired properties to the polymer composition in most cases. Amounts greater than this minimum level of stabilizer can, of course, be employed, although at some point the increase in stabilization of the polymer is not commensurate with the additional amount of stabilizer employed. While there is no critical upper limit to the amount of stabilizer composition which may be employed, amounts in excess of about 2 wt. % do not give an increase in effectiveness which will justify the use of these higher amounts of stabilizer.

The halogenated polymer compositions that are stabilized by the stabilizer compositions described above are limited to clear formulations. While not wishing to be bound by any particular theory, it is believed that in clear formulations, sufficient energy (hv) is provided to allow a photo-fries rearrangement in situ of the phenyl salicylate compound to its corresponding, functionally active, benzophenone type structure capable of absorbing ultraviolet radiation throughout the clear polymer composition. While in pigmented formulations, it is believed that photo-fries arrangement of the phenyl salicylate compound to its functionally active form is prevented for the most part.

The halogenated polymers to be stabilized by the above stabilizer compositions and that are employed in the clear polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alky methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chlorothelene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylemethacrylate, polyvinyl chloride and polystyrene, polyvinyl chloride and acrylonitrile-butadiene-styrene copolymer, and polyvinyl chloride and polyetheylene and polymethy methacrylate. Typical vinyl halide copolymers usable in this invention include vinyl chloride-vinyl acetate (87:13), vinyl chloride-vinylidene chloride (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer.

In addition to the halogenated polymer and the stabilizer composition, the polymer compositions of this invention may contain conventional additives such as lubricants, antioxidants, impact modifiers, process aids, co-stabilizers, toners, and sometimes plasticizers.

The following examples illustrate the present invention. Unless otherwise indicated, the stabilizer components and other auxiliary ingredients are specified in parts by weight per hundred parts of the halogenated resin ("phr").

Examples 2, 4, 8 and 10 demonstrate the superior heat, light and weathering stabilization of stabilizer compositions according to this invention in clear halogenated polymer compositions.

EXAMPLES 1 to 4

Examples 1 and 3 are Comparative

The following ingredients were blended together in the amounts given to provide four clear polyvinyl chloride compositions, two being stabilized with an organotin mercaptide alone and the other two being stabilized with an organotin mercaptide and phenyl salicylate compound according to this invention.

| | Phr | | | |
|---|---|---|---|---|
| Ingredients | Example 1 | Example 2 | Example 3 | Example 4 |
| PVC Resin (Borden BCP-59) | 100 | 100 | 100 | 100 |
| Impact Modifier (Kaneka B-22) | 6.0 | 6.0 | 6.0 | 6.0 |
| Process Aid (Rohm & Haas Acryloid K-120N) | 1.5 | 1.5 | 1.5 | 1.5 |
| Ester Wax Lubricant (Henkel LoxioI G-16) | 1.0 | 1.0 | 1.0 | 1.0 |
| Ester Wax Lubricant (Henkel LoxioI G-70) | 0.7 | 0.7 | 0.7 | 0.7 |
| Oxidized Polyethylene Lubricant (Allied AC-629A) | 0.2 | 0.2 | 0.2 | 0.2 |
| Epoxidized Soy Bean Oil Costabilizer | 1.0 | 1.0 | 1.0 | 1.0 |
| Organotin Mercaptide (Morton Advastab ® TM-181)[1] | 1.2 | 1.2 | 1.2 | 1.2 |
| Phenyl Salicylate (Aldrich) | — | 0.1 | | |
| Dodecylphenylsalicylate (Aldrich) | | | — | 0.1 |

[1]Morton Advastab ® TM-181 Stabilizer is a mixture of 80 wt. % dimethyltin bis (2-ethylhexylthioglycolate) and 20 wt. % monomethyltin tris (2-ethylhexylthioglycolate).

Each resulting polymer composition was then formed into a plaque and tested for stability to light and weathering by exposing it to ultraviolet light (UV) and moisture in a Q-Panel QUV accelerated weathering tester. Each plaque was weathered at 50° C. by exposing it to 4 hours of UV followed by 4 hours of moisture condensation cycle. This was repeated until the plaque had been exposed for 960 hours. Samples were taken for evaluation every 160 hours. Color values were read using a Hunter colorimeter. Delta E (total color change) readings for each composition using the initial (0 hour) sample as a color reference are given in the Table below.

| | Delta E | | | | | |
|---|---|---|---|---|---|---|
| Hours | 160 | 320 | 480 | 640 | 800 | 960 |
| Example 1 | 2.7 | 5.9 | 10.7 | 11.5 | 12.3 | 13.6 |
| Example 2 | 2.2 | 4.7 | 9.8 | 9.9 | 10.0 | 9.6 |
| Example 3 | 8.7 | 14.6 | 18.7 | 20.8 | 21.1 | 20.9 |
| Example 4 | 7.7 | 11.9 | 16.7 | 17.3 | 18.7 | 18.8 |

The above results demonstrate: 1) that organotin mercaptides alone are poor weathering stabilizers; and 2) the weathering stabilization of organotin mercaptides is significantly improved by their use in combination with phenyl salicylate compounds in clear polyvinyl chloride compositions.

EXAMPLES 5 to 6

Examples 5 and 6 are Comparative

The following ingredients were blended together in the amounts given to provide two pigmented polyvinyl chloride compositions, one being stabilized with an organotin mercaptide alone and the other being stabilized with an organotin mercaptide in combination with a phenyl salicylate compound.

| | Phr | |
|---|---|---|
| Ingredients | Example 5 | Example 6 |
| PVC Resin (Geon 103-EP) | 100 | 100 |
| Impact Modifier (Rohm & Haas KM-330) | 6.0 | 6.0 |
| Process Aid (Rohm & Haas Acryloid K-120N) | 1.5 | 1.5 |
| Titanium Dioxide Pigment (Du Pont R-960) | 1.0 | 1.0 |
| Calcium Stearate Lubricant | 1.8 | 1.8 |
| Paraffin Wax Lubricant (XL-165) | 1.0 | 1.0 |
| Oxidized Polyethylene Lubricant (Allied AC-629A) | 0.15 | 0.15 |
| Organotin Mercaptide (Morton Advastab ® TM-181) | 1.2 | 1.2 |
| 2'-Dodecylphenylsalicylate (Aldrich) | — | 0.1 |

Each resulting polymer composition was QUV weathering tested in accordance with the procedure outlined in the Examples 1–4. Delta E (total color change) readings for each composition using the initial (0 hour) sample as a color reference are given in the Table below.

| | Delta E | | | | | |
|---|---|---|---|---|---|---|
| Hours | 160 | 320 | 480 | 640 | 800 | 960 |
| Example 5 | 6.4 | 12.4 | 15.9 | 1.3 | 11.9 | 0.0 |
| Example 6 | 10.5 | 13.4 | 14.8 | 2.1 | 6.2 | 2.0 |

The above results demonstrate: 1) that organotin mercaptides alone are poor weathering stabilizers; and 2) no benefit in terms of weathering stabilization is provided by their use in combination with phenyl salicylate compounds in pigmented polyvinyl chloride compositions, as the phenyl salicylate compounds are not functionally active therein.

EXAMPLES 7 to 8

Example 7 is Comparative

The following ingredients were blended together in the amounts given to provide two clear polyvinyl chloride compositions, one being stabilized with an organotin mercaptide alone and the other being stabilized with an organotin mercaptide and phenyl salicylate compound according to this invention.

| | Phr | |
|---|---|---|
| Ingredients | Example 7 | Example 8 |
| PVC Resin (Borden BCP-59) | 100 | 100 |
| Impact Modifier (Kaneka B-22) | 6.0 | 6.0 |
| Process Aid (Rohm & Haas Acryloid K-120N) | 1.5 | 1.5 |
| Ester Wax Lubricant (Henkel Loxiol G-16) | 1.0 | 1.0 |

-continued

| Ingredients | Phr | |
|---|---|---|
| | Example 7 | Example 8 |
| Ester Wax Lubricant (Henkel Loxiol G-70) | 0.7 | 0.7 |
| Oxidized Polyethylene Lubricant (Allied AC-629A) | 0.2 | 0.2 |
| Epoxidized Soy Bean Oil Costabilizer | 1.0 | 1.0 |
| Organotin Mercaptide (Morton Advastab ® TM-283)[1] | 1.2 | 1.2 |
| Phenyl Salicylate (Aldrich) | — | 0.1 |

[1]Morton Advastab ® TM-283 Stabilizer comprises fatty acids, tall oil, 2-mercaptoethyl esters, reaction products with dichlorndimethyl stannane, 2-mercaptoethyl decanoate 2-mercaptoethyl octanoate, sodium sulfide, and trichloromethyl stannane.

Each resulting polymer composition was then formed into a plaque and tested for stability to light and weathering by exposing it to outdoor weathering conditions in Cincinnati, Ohio. Each plaque was mounted on panels which faced south at 45° upward angle. Each plaque was removed in month intervals. Color values were read using a Hunter Colorimeter. Delta E (total color change) readings for each composition using the initial (0 hour) sample as a color reference are given in the Table below.

| | Delta E | | | | | | | |
|---|---|---|---|---|---|---|---|---|
| Months | 1 | 2 | 3 | 4 | 5 | 6 | 7 | 8 |
| Example 7 | 44 | 6.7 | 13.8 | 19.6 | 23.4 | 25.3 | 31.3 | 31.5 |
| Example 8 | 1.8 | 2.6 | 6.0 | 9.0 | 12.7 | 17.2 | 23.1 | 23.7 |

The above results demonstrate: 1) that organotin mercaptides alone are poor weathering stabilizers; and 2) the weathering stabilization of organotin mercaptides is significantly improved by their use in combination with phenyl salicylate compounds in clear polyvinyl chloride compositions.

EXAMPLES 9 to 10

Example 9 is Comparative

The following ingredients were blended together in the amounts given to provide two clear polyvinyl chloride compositions, one being stabilized with an organotin carboxylate alone and the other being stabilized with an organotin carboxylate and phenyl salicylate compound according to this invention.

| Ingredients | Phr | |
|---|---|---|
| | Example 9 | Example 10 |
| PVC Resin (Borden BCP-59) | 100 | 100 |
| Impact Modifier (Kaneka B-22) | 6.0 | 6.0 |
| Process Aid (Rohm & Haas Acryloid K-120N) | 1.5 | 1.5 |
| Ester Wax Lubricant (Henkel Loxiol G-16) | 1.0 | 1.0 |
| Ester Wax Lubricant (Henkel Loxiol G-70) | 0.7 | 0.7 |
| Oxidized Polyethylene Lubricant (Allied AC-629A) | 0.2 | 0.2 |

-continued

| Ingredients | Phr | |
|---|---|---|
| | Example 9 | Example 10 |
| Epoxidized Soy Bean Oil Costabilizer | 1.0 | 1.0 |
| Organotin Carboxylate (Dibutyl Bis (Butyl Maleate)) | 2.0 | 2.0 |
| Phenyl Salicylate (Aldrich) | — | 0.1 |

Each resulting polymer composition was then formed into a plaque and tested for stability to light and weathering by the QUV weathering procedure outlined in Examples 1–4. Delta E (total color change) readings for each composition using the initial (0 hour) sample as a color reference are given in the Table below.

| | Delta E | | | | | |
|---|---|---|---|---|---|---|
| Hours | 160 | 320 | 480 | 640 | 800 | 960 |
| Example 9 | 0.4 | 1.3 | 5.4 | 5.5 | 8.4 | 10.0 |
| Example 10 | 1.0 | 1.3 | 3.6 | 4.0 | 6.5 | 6.7 |

The above results demonstrate: 1) that organotin carboxylates alone are adequate weathering stabilizers; and 2) the weathering stabilization of organotin mercaptides is significantly improved by their use in combination with phenyl salicylate compounds in clear polyvinyl chloride compositions.

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A clear halogenated polymer composition stabilized against the deteriorative effects of heat, light and weathering, said composition being capable of producing substantially transparent articles, said composition comprising a halogenated polymer and, in an amount sufficient to stabilize said polymer against the deteriorative effects of heat, light and weathering, a stabilizer composition consisting essentially of:

A) an organotin compound or mixture of organotin compounds selected from the group consisting of organotin mercaptides, sulfides of organotin mercaptides, organotin sulfides, organotin carboxylates, and mixtures thereof; and, B) in an amount sufficient to synergize the stabilization of the clear halogenated polymer compositions, a free phenyl salicylate compound.

2. The composition of claim 1 which contains from about 0.5 to about 2 wt % of said stabilizer composition relative to the weight of the halogenated polymer.

3. The composition of claim 1, wherein said free phenyl salicylate has the formula:

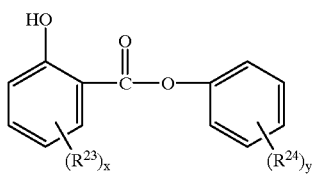

where

R²³ and R²⁴ are at each independent occurrence selected from hydrogen, an alkyl, phenyl, alkoxy, phenoxy, alkylcarboxy, hydroxyl, halogen, carboxyl, benzoyl, glycidyl, glycidylamino, alkylamino, amido, hydroxypolyalkoxy, alkoxypolyalkoxy, or acyloxypolyalkoxy radical; and, x is any integer from 1 to 4 and y is any integer from 1 to 5.

4. The composition of claim 1, wherein the organotin compound is an organotin mercaptide selected from the group consisting of monoalkyltin tris(alkylthioalkanoates), dialkyltin bis(alkylthioalkanoates), and mixtures thereof.

5. The composition of claim 1, wherein the organotin compound is a corresponding sulfide of an organotin mercaptide selected from the group consisting of monoalkyltin tris(alkylthioalkanoates), dialkyltin bis(alkylthioalkanoates), and mixtures thereof.

6. The composition of claim 1, wherein the organotin compound is an organotin mercaptide selected from the group consisting of monoalkyltin tris(mercaptoalkylalkanoates), dialkyltin bis(mercaptoalkylalkanoates), and mixtures thereof.

7. The composition of claim 1, wherein the organotin compound is a corresponding sulfide of an organotin mercaptide selected from the group consisting of monoalkyltin tris(mercaptoalkylalkanoates), dialkyltin bis(mercaptoalkylalkanoates), and mixtures thereof.

8. The composition of claim 1, wherein the organotin compound is an organotin carboxylate selected from the group consisting of monoalkyltin tris(alkylalkanoates), dialkyltin bis(alkylalkanoates), and mixtures thereof.

* * * * *